(12) United States Patent
Nguyen et al.

(10) Patent No.: US 8,775,699 B2
(45) Date of Patent: Jul. 8, 2014

(54) READ STACKING FOR DATA PROCESSOR INTERFACE

(75) Inventors: Thang Q. Nguyen, Austin, TX (US); Gus P. Ikonomopoulos, Lakeway, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 218 days.

(21) Appl. No.: 13/038,054

(22) Filed: Mar. 1, 2011

(65) Prior Publication Data

US 2012/0226841 A1 Sep. 6, 2012

(51) Int. Cl.
*G06F 3/00* (2006.01)

(52) U.S. Cl.
USPC ........... 710/56; 710/52; 710/53; 710/54; 710/55; 710/57

(58) Field of Classification Search
None
See application file for complete search history.

(56) References Cited

U.S. PATENT DOCUMENTS

| | | | | |
|---|---|---|---|---|
| 5,307,459 A | * | 4/1994 | Petersen et al. | 709/250 |
| 5,412,782 A | * | 5/1995 | Hausman et al. | 709/250 |
| 5,434,872 A | * | 7/1995 | Petersen et al. | 714/811 |
| 5,717,932 A | * | 2/1998 | Szczepanek et al. | 710/260 |
| 5,829,042 A | * | 10/1998 | Leung | 711/147 |
| 6,256,677 B1 | * | 7/2001 | Pribnow et al. | 709/250 |
| 6,351,780 B1 | * | 2/2002 | Ecclesine | 710/22 |
| 6,898,699 B2 | * | 5/2005 | Jourdan et al. | 712/243 |
| 6,993,633 B1 | * | 1/2006 | Sakakibara et al. | 711/146 |
| 7,246,191 B2 | * | 7/2007 | Stanton | 710/310 |
| 7,657,771 B2 | * | 2/2010 | Allen et al. | 713/401 |
| 2002/0199079 A1 | * | 12/2002 | Gonzales et al. | 711/219 |
| 2007/0156946 A1 | * | 7/2007 | Lakshmanamurthy et al. | .. 711/5 |
| 2008/0162769 A1 | * | 7/2008 | Wojciechowski | 710/308 |
| 2009/0195542 A1 | * | 8/2009 | Kawamura et al. | 345/422 |
| 2011/0179200 A1 | * | 7/2011 | Sukonik et al. | 710/53 |

\* cited by examiner

*Primary Examiner* — Henry Tsai
*Assistant Examiner* — Jing-Yih Shyu

(57) ABSTRACT

A gasket of a data processing device controls the number of released storage locations of a buffer where read and write access requests are stored so that more read access requests can be stored without a corresponding increase in the amount of space at the buffer to store write access requests. An interface of the gasket accepts new access requests from one or more requesting modules only when a number of released storage locations at a buffer associated with the interface (referred to as an outbound buffer) is above a threshold number. As long as the number of stored access requests at the outbound buffer are less than a threshold amount, a buffer location can be immediately released. In addition, the gasket is configured to issue read access requests from the outbound buffer without regard to whether the inbound buffer has space available.

18 Claims, 6 Drawing Sheets

READ STACKING FOR DATA PROCESSOR INTERFACE

FIELD OF THE DISCLOSURE

The present disclosure relates generally to data processing devices, and more particularly to data transfer for data processing devices.

BACKGROUND

A data processing device typically employs one or more interfaces to facilitate transfer of information between modules of the data processing device. For example, some data processing devices include an interconnect that routes communications between device modules, including processor cores, memory modules, input/output modules, and the like. The interconnect typically includes one or more protocol translation modules, referred to as gaskets, to translate access requests and information between various protocols (formats). For example, the gasket can translate information between a proprietary format associated specifically with the data processing device to a standardized format, such as peripheral component interconnect express (PCIE) format. In addition, to improve communication bandwidth, a gasket can include buffers to temporarily store both received read and write access requests and information responsive to the access requests. However, using large buffers at the interface, while providing a desirable communication bandwidth, can consume an undesirable amount of integrated circuit area. Further, the buffering of access requests can increase latency at the interconnect, thereby reducing data transfer bandwidth.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-6 illustrate example techniques for managing buffered access requests at a protocol translation module (gasket) of a data processing device. The gasket controls the number of released storage locations of a buffer where read and write access requests are stored so that more read access requests can be stored without a corresponding increase in the amount of space at the buffer needed to store more write access requests. To illustrate, an interface of the gasket accepts new access requests from one or more requesting modules only when a number of released storage locations at a buffer associated with the interface (referred to as an outbound buffer) is above a threshold number. The interface further reduces the number of released storage locations in response to receiving a new access request. However, read access requests do not require as much storage space as write access requests. Accordingly, as long as the number of stored access requests at the outbound buffer are less than a threshold amount, a buffer location can be immediately released in response to the buffer storing a read access request. The outbound buffer can thereby store more read requests without necessitating a redesign of the interface that receives the read access requests.

In addition, the gasket can include an inbound buffer, wherein the inbound buffer stores information responsive to read access requests issued by the gasket prior to being forwarded to the requesting client. The interface is configured to issue read access requests to prefetchable memory space from the outbound buffer without regard to whether the inbound buffer has space available. If the inbound buffer does not have space to store information responsive to a read access request, the interface reissues the read access request. If the number of times a read access request has been reissued exceeds a threshold, the read access request is not reissued until space is available at the inbound buffer to store the information responsive to the read access request.

By issuing read access requests without regard to whether inbound buffer space is available, data transfer bandwidth can be improved. In particular, there is typically a relatively long delay between the time a read access request is issued from the interface and the time that responsive data is received. Accordingly, it is likely that during that delay inbound buffer space will have been freed, so that the inbound buffer can store the responsive data. In the event that the buffer space has not been freed, reissuing of the read access request ensures that the responsive data will eventually be stored at the inbound buffer.

Figure 1:
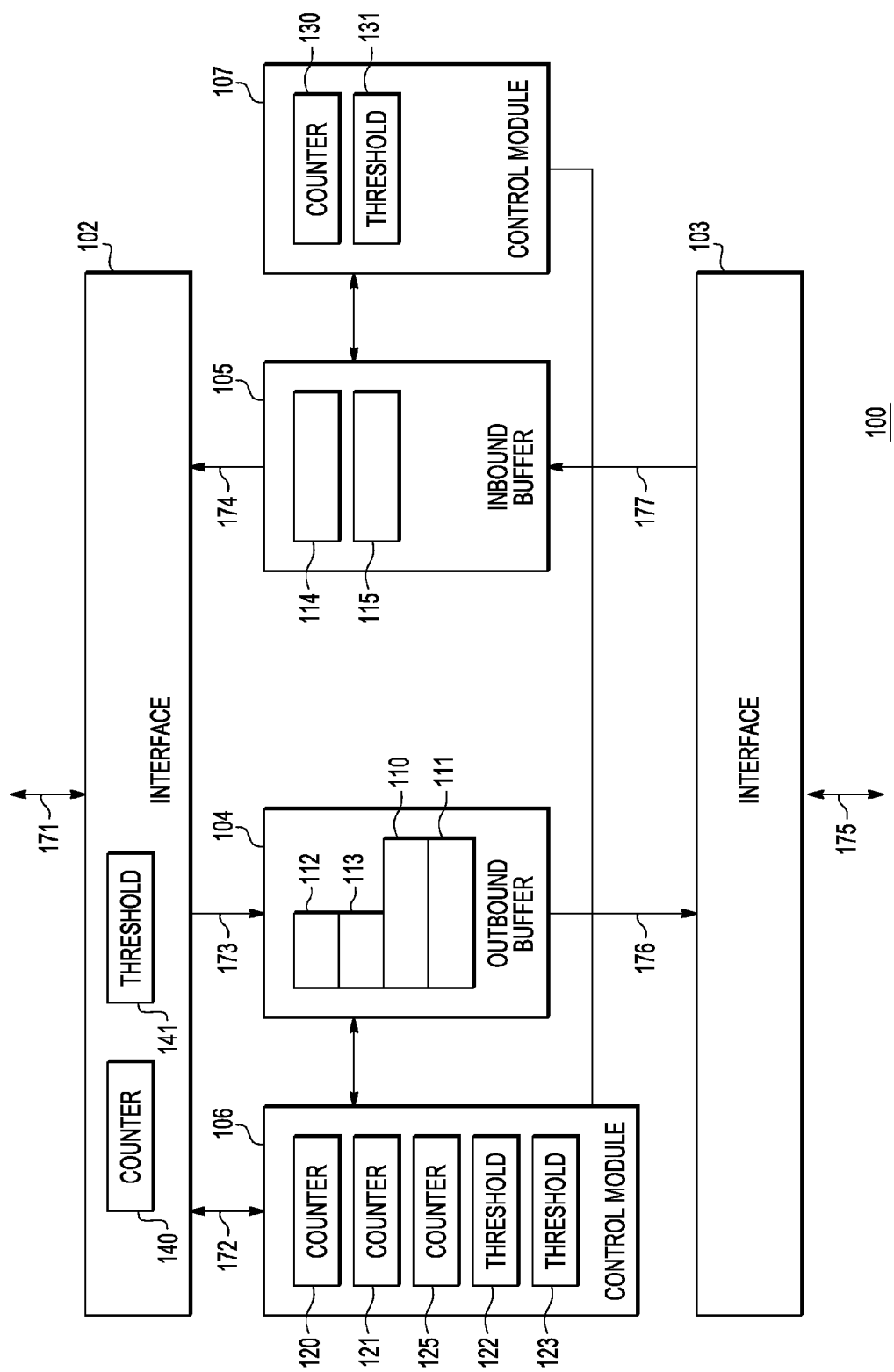
FIG. 1 is a block diagram illustrating a portion of a data processing device in accordance with a specific embodiment of the present disclosure.

FIG. 1 illustrates a gasket 100 associated with a data processing device in accordance with one embodiment of the present disclosure. The data processing device can be a general purpose or application specific data processing device that includes a set of device modules, including one or more processor cores, memory modules, input/output modules, and the like. The data processing device is an electronic device, such as a computer device, portable electronic device, automotive device, and the like that employs these modules to perform designated operations. In the course of performing operations, the data processing device can transfer information between device modules (not shown) that are clients of the interconnect illustrated at FIG. 1, referred to herein as client modules. Transfer of information is effected via the generation of access requests by a requesting module. In particular, a requesting module can generate a write access request in order to transfer information from the requesting module to another module, referred to as a destination module. A requesting module can also generate a read access request to request transfer of information from the destination module to the generating module. For purposes of discussion, the data path of the gasket 100 that communicates read and write access requests from the requesting module to the destination module is referred to as the outbound data path. The data path of the gasket 100 that communicates information from the destination module to the requesting module, responsive to a read access request, is referred to as the inbound data path.

The gasket 100 includes an interface 102, an interface 103, an outbound buffer 104, an inbound buffer 105, and control modules 106 and 107. The interface 102 is connected to busses 171-174. The control module 106 is connected to the bus 172 to the control module 107, and to the outbound buffer 104. The outbound buffer 104 is also connected to the bus 173 and to a bus 176. The inbound buffer 105 is connected to the control module 107, to the bus 174, and to a bus 177. The interface 103 is connected to busses 175-177.

The interfaces 102 and 103 are modules configured to facilitate transfers of information between other modules of the data processing device 100. To illustrate, the interface 102 is configured to receive, via bus 171, access requests from one or more requesting modules, such as processor cores, direct memory access modules, input/output modules and the like. In an embodiment, the bus 171 is connected to a switch fabric (not illustrated) that receives access requests from a plurality of requesting modules and routes the access requests to the interface 102. As described further herein, the interface 102 can manage communication of the read and write access requests to their corresponding destination modules. The interface 102 can also perform other functions, such as translation of the read and write requests from a format associated with the bus 171 to a format associated with the interface 103. For example, in an embodiment the received read and write access requests are formatted according to a proprietary protocol associated with the data processing device 100. The interface 103 and bus 175 are configured to communicate information according to a standard protocol such as PCIE. Accordingly, the interface 102 can translate the received read and write requests from the proprietary format to the format associated with the standard protocol.

The interface 103 is connected, via the bus 175, to one or more modules of the data processing device 100 that can be the target of read and write access requests, such as memory modules, input/output modules, slave devices, and the like. In an embodiment, the interface 103 performs data link layer operations for read and write access requests, and for responses to read requests, according to a standard protocol, such as PCIE.

The outbound buffer 104 is a memory structure configured to store a limited number of read access requests and write access requests. In particular, because they include both address information and payload data, write accesses requests are larger than read access requests that do not include payload data. The outbound buffer 104 includes a set of storage locations, referred to herein as general storage locations, that can store either read access requests or write access requests, and smaller storage locations, referred to as read-specific storage locations, that can store only read access requests. In the illustrated embodiment, the outbound buffer 104 includes two general storage locations, designated storage locations 110 and 111, and two read-specific storage locations, designated storage locations 112 and 113. Thus, the outbound buffer 104 can store up to four read access requests and up to two write access requests.

In an embodiment, the outbound buffer 104 communicates stored access requests to the interface 103, where the access requests are translated and routed to their respective destination modules. In an embodiment, each access request can be translated into multiple sub-requests for communication to the destination module. Communication of an access request to the interface 103 is referred to for purposes of discussion as issuing the access request. As described further herein, the outbound buffer 104 continues to store the access request after it is issued until it receives an indication from the interface 103, the interface 102, or other module that the access request has been completed.

Management of storage of access requests at the outbound buffer 104 is controlled by control module 106 in conjunction with the interface 102. To illustrate, the interface 102 includes a counter 140 and a threshold register 141. The counter 140 is configured to store an adjustable value that indicates the number of storage locations at the outbound buffer 104 that are released storage locations. During an initialization process for the data processing device 100, the value stored at the counter 140 is set to be equal to the number of general storage locations at the outbound buffer 104. For example, in the illustrated embodiment, during the initialization process the counter 140 will be set to an initial value of 2, reflecting the two general storage locations at the outbound buffer 104.

The threshold register 141 is configured to store a threshold value indicating the minimum number of released storage locations at the outbound buffer 104 that are to be maintained. The interface 102 is configured to compare the number of released storage locations, as indicated by the counter 140, to the threshold value indicated by threshold register 141 and, in response to determining the number of released storage locations is less than the threshold value, provide an indication via the bus 171 that the interface 102 will not accept additional access requests. In response, the modules connected to the bus 171 will suspend communicating access requests to the interface 102. In response to determining that the number of released memory locations is greater than or equal to the threshold value stored at the threshold register 141, the interface 102 communicates an indication via the bus 171 that the modules connected to the bus can resume communication of access requests. The interface 102 thus prevents undesired overwriting of pending access requests stored at the outbound buffer 104.

This can be better understood with reference to an example where the threshold value stored at the threshold register 141 is set to the value 1. Accordingly, in response to determining the number of released storage locations, as indicated by the counter 140, is zero, the interface 102 indicates via the bus 171 that communication of access requests to the interface is suspended. In response to determining that the number of released storage locations is at least 1, the interface 102 indicates via the bus 171 that communication of access requests can be resumed.

In an embodiment, the interface 102 is configured to assume that each received access request will occupy a general storage location at the outbound buffer 104. Accordingly, in response to receiving any access request via the bus 171, the interface 102 reduces the value stored at the counter 140 by one, thereby reducing the number of released storage locations by one.

The control module 106 is configured to indicate, based on the information stored at the outbound buffer 104, whether the number of released buffer locations is to be increased. For example, the control module 106 can indicate, via the bus 172 a release request, that the number of released buffer locations is to be increased. In response to a release request, the interface 102 increases the value stored at the counter 140 by one.

As described further herein, the control module 106 sends release requests based on the number and type of access requests stored at the outbound buffer 104, the number and type of pending requests, and on when those access requests have been completed. A pending request refers to an access request that has been received at the interface 102, is stored at the outbound buffer 104, and is awaiting an indication that the access request has been completed.

The control module 106 includes counters 120, 121, and 125 and threshold registers 122 and 123. The counter 120 stores a value indicating the number of storage locations at the outbound buffer 104 that are available to store an access request, i.e. they do not store a pending access request. As used herein, an access request is pending if the outbound buffer 104 or the interface 102 has not received an indication that the access request has been completed. A read access request is completed when data responsive to the read access request has been provided to the inbound buffer 105 or to the requesting device of the data processing device 100. A write access request has been completed when the data associated with the write access request has been stored at the destination indicated by the write access request.

The counter 121 stores the number of pending read access requests stored at the outbound buffer 104. The counter 125 stores the number of pending write access requests stored at the outbound buffer 104. The threshold register 122 stores the number of general storage locations at the outbound buffer 104. The threshold register 123 stores a minimum number of storage locations. In an embodiment, the threshold register 123 stores a value of one.

In operation, the control module determines whether to issue a release request based on the type of access requests received, the number of access requests stored at the outbound buffer 104. This can be better understood with reference to FIG. 2, which illustrates a flow diagram of a method of controlling the outbound buffer 104 in accordance with one embodiment of the present disclosure. At block 201, the interface 102 receives an access request. In response, it adjusts the value stored at the counter 140 to reduce the indicated number of released storage locations by one irrespective of whether the access request is a read or write access request. At block 202, the interface 102 provides the received access request to the outbound buffer 104 for storage. At block 203, the control module 106 determines whether the access request is a write access request or a read access request. If the access request is a write access request, the method flow proceeds to block 204 wherein the control module 106 waits to send a release request to the interface 102 until it receives a notification that the write access request is complete. In an embodiment, the notification is provided by the interface 103 in response to providing the write access request to a communication fabric (not shown) connected to the interface 103.

If at block 203, the control module 106 determines that the received access request is a read access request, the method flow proceeds to block 205, and the control module 106 determines whether the read access request is directed to prefetchable memory space. As used herein, prefetchable memory space is space designated as such by an operating system or other memory management module of a data processing device, wherein indeterminate timing of reads and writes to the prefetchable memory space is allowed. If the read access request is not directed to prefetchable memory space, the method flow proceeds to block 204 and the control module 106 does not send a release request for the received access request until it receives a notification that the read access request is complete.

If the read access request is directed to prefetchable memory space, the method flow proceeds to block 206 and the control module 106 determines whether 1) the number of available storage locations at the outbound buffer 104 is greater than the threshold value stored at the threshold register 122 and 2) whether there are no pending writes as indicated by the value stored at the counter 125. If both conditions are true, the method flow proceeds to block 207 and the control module 106 sends a release request without waiting for an indication that the received read access request has been completed.

If either of the conditions at block 206 are not true, the method flow moves to block 208 and the control module 106 determines 1) whether the number of available storage locations at the outbound buffer 104 is greater than one and 2) whether there are pending write access requests and the number of pending write access requests, as indicated by the value stored at the counter 125 is less than or equal to the value stored at the threshold register 122 minus 1. If both of these conditions are true, the method flow moves to block 207 and the control module 106 sends a release request without waiting for an indication that the received read access request has been completed. If either of these conditions is not true, the method flow moves to block 204 and the control module 106 does not send a release request for the read access request until it receives a notification that the write access request is complete. In an embodiment, the notification is provided by the interface 102 in response to receiving an indication that data responsive to the read access request has been received at the module that generated the read access request.

Figure 2:
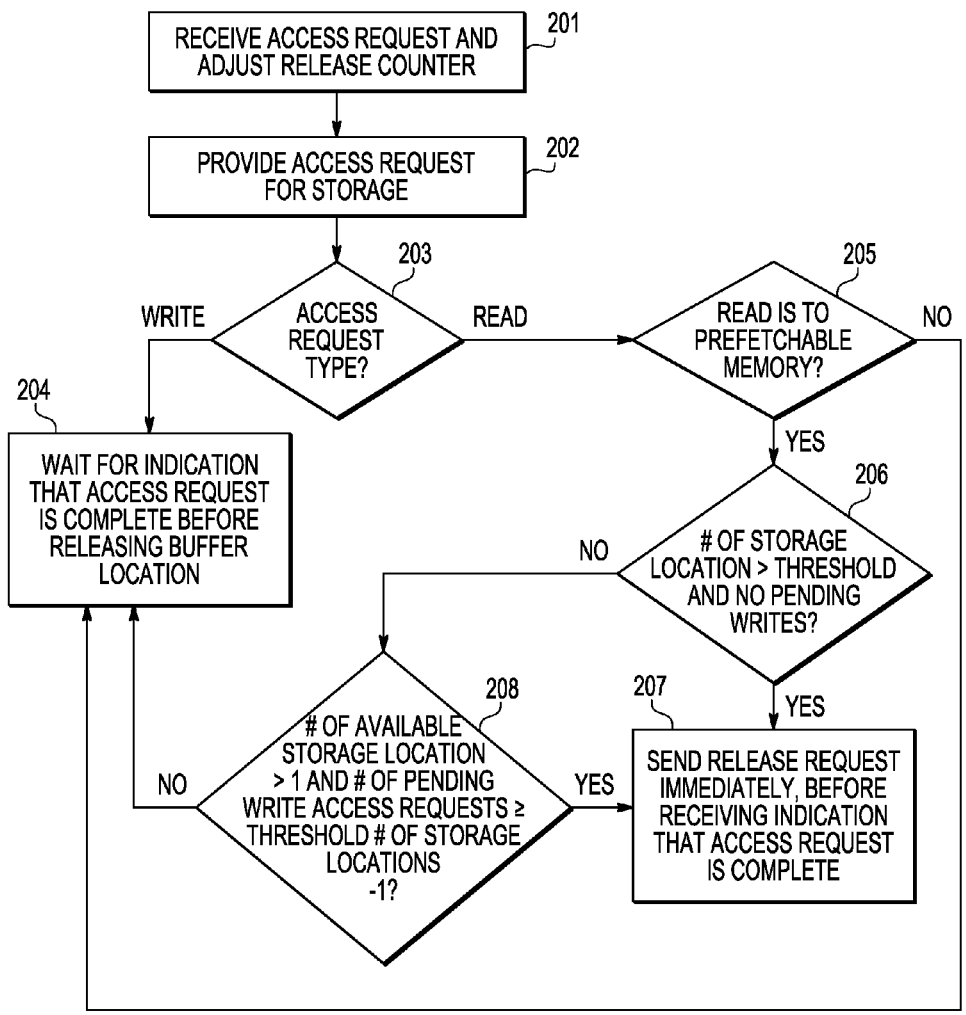
FIG. 2 is a flow diagram of a method of managing read access requests at the data processing device of FIG. 1 in accordance with one embodiment of the present disclosure.

By employing the management technique illustrated at FIG. 2, the control module 106 can allow for storage of more access requests without redesign of the interface 102. In particular, in some embodiments the interface 102 is configured such that it can only determine the number of general storage locations at the outbound buffer 104. A data processing device employing conventional management of the outbound buffer 104 would therefore be limited to store a maximum of two access requests. In contrast, by employing the management technique illustrated at FIG. 2, the control module 106 allows the buffer to store up to four access requests with a maximum of two write access requests.

Referring again to FIG. 1, the inbound buffer 105 includes a set of storage locations, with each storage location configured to store data responsive to a read access request received via the bus 177. In the illustrated example of FIG. 1, the inbound buffer 105 includes two storage locations, designated storage locations 114 and 115.

The control module 107 is configured to control storage of responsive data such that more read access requests can be issued by the interface 103 than there is space available to store responsive data to the issued requests. To illustrate, the control module 107 includes a counter 130 to store a value indicating the number of times a read access request has been reissued, referred to as the read reissue count, and includes a threshold register 131 to store a value indicating the maximum number of times a read request can be reissued.

Figure 3:
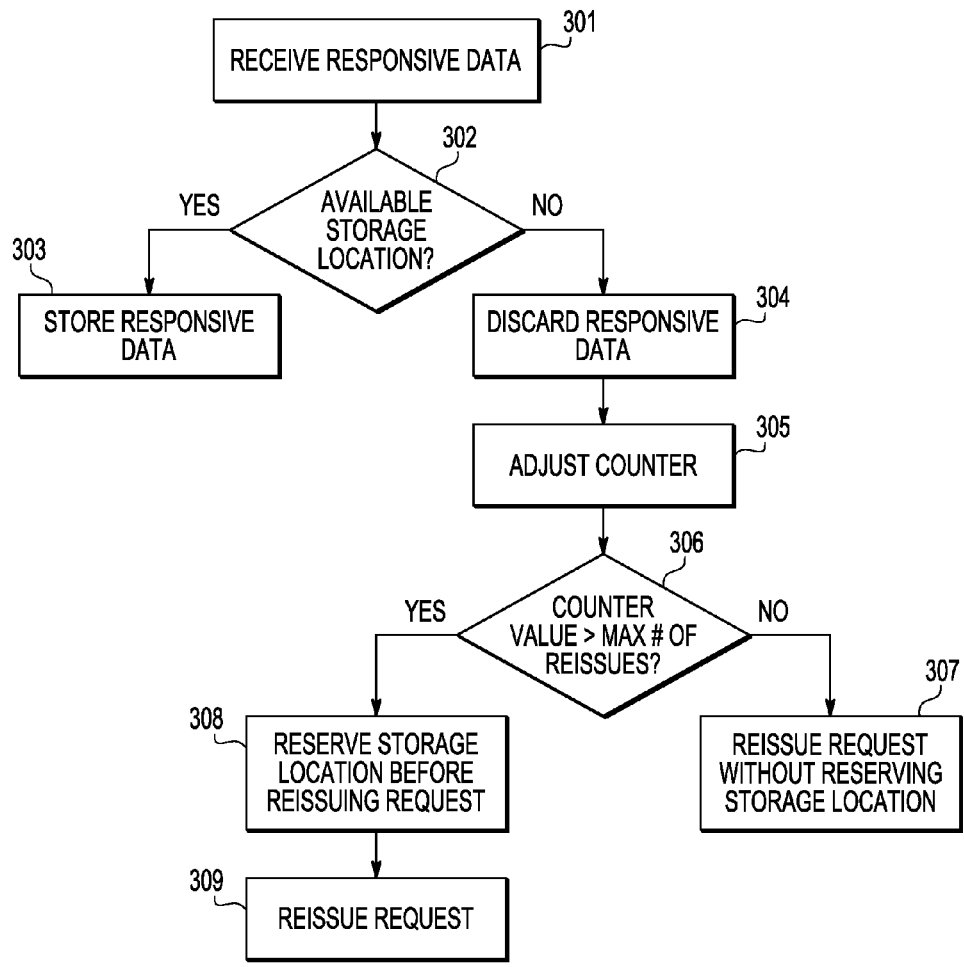
FIG. 3 is a flow diagram of a method of managing responses to read access requests at the data processing device of FIG. 1 in accordance with one embodiment of the present disclosure.

The operation of the control module 107 and the inbound buffer 105 can be better understood with reference to FIG. 3, which illustrates a flow diagram of a method of controlling the inbound buffer 105 in accordance with one embodiment of the present disclosure. At block 301 responsive data is received at the inbound buffer 105. At block 302 the control module 107 determines if there is a storage location available to store the responsive data. If so, the method flow proceeds to block 303 and the control module 107 stores the responsive data at an available storage location. In an embodiment, the inbound buffer 105 is configured such that it can begin storing responsive data at a portion of a storage location while previous responsive data is being removed from another portion of the storage location. Accordingly, a storage location can be determined to be available if the responsive data stored there is in the process of being communicated to the interface 102.

If, at block 302, the control module 107 determines that there is no storage location available to store the received responsive data, the method flow proceeds to block 304 and the control module 107 commands the inbound buffer 105 to discard the responsive data. At block 305 the control module 107 increments the read reissue count stored at the counter 130. At block 306 the control module 107 determines whether the read reissue count exceeds the maximum number of reissues as indicated by the threshold register 131. If the read reissue count does not exceed the maximum number of reissues, the method flow proceeds to block 307 and the control module 107 requests that the outbound buffer 104 reissue the read request associated with the discarded responsive data, without reserving a storage location at the inbound buffer 105. If the read reissue count does exceed the maximum number of reissues, the method flow proceeds to block 308 and the control module 107 waits to request a reissue of the read access request until there is a storage location available to store responsive data at the inbound buffer 105 and reserves the storage location, thereby making the storage location unavailable for storage of data responsive to other read access requests. At block 309, the control module 107 requests the outbound buffer 104 to reissue the read access request associated with the discarded data.

Thus, the control module 107 and the inbound buffer 105 are together configured to reserve storage locations for a read access request only after data responsive to the read access request has been discarded a threshold number of times. This allows read requests to be issued from the outbound buffer 104 without regard to whether a storage location is currently available to store responsive data. In contrast, conventional systems do not issue read requests until a storage location has been reserved at an inbound buffer. This can undesirably limit the rate at which read requests are issued.

Figure 4:
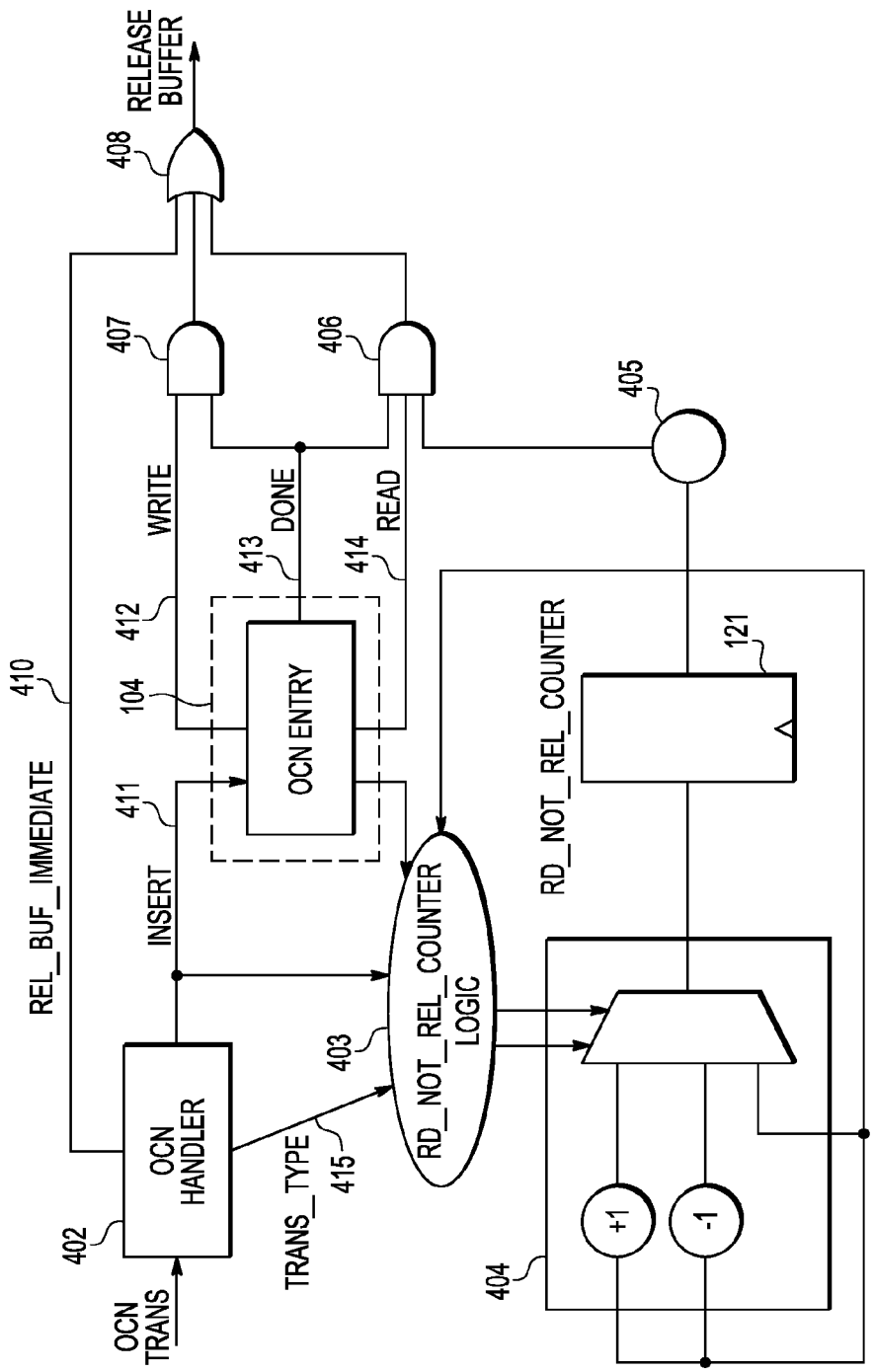
FIG. 4 is a block diagram of a portion of the data processing device of FIG. 1 in accordance with one embodiment of the present disclosure.

FIG. 4 illustrates a portion of the control module 106 and outbound buffer 104 in accordance with one embodiment of the present disclosure. In particular, FIG. 4 illustrates an entry of the outbound buffer 104, a handler module 402, counter logic 403, an adjustment module 404, the counter 121, a compare module 405, AND gates 406 and 407, and OR gate 408. The handler module includes an input connected to the bus 172 and outputs connected to busses 410, 411, and 415. The entry of the outbound buffer 104 includes connections to busses 411, 412, 413, and 414, and a connection to the counter logic 403. The counter logic 403 also includes connections to the adjustment module 404. The adjustment module 404 includes an output connected to the counter 121. The counter 121 includes an output connected to the compare module 405, which includes an output connected to an input of the AND gate 406. The AND gate 406 also includes inputs connected to busses 413 and 414 and an output. The AND gate 407 includes inputs connected to busses 412 and 413 and an output. The OR gate 408 includes inputs connected to the bus 410, to the output of the AND gate 407, and to the output of the AND gate 406, and an output to provide a signal, labeled "RELEASE", requesting that the number of released outbound buffer locations at the interface 102 be increased.

In operation, the handler module 402 receives access requests, such as read access requests and write access requests, via the bus 172. If the handler module 402 determines, based on the transaction request, that a buffer location can be immediately released, it asserts a signal via bus 410, which in turn causes OR gate 408 to assert the RELEASE signal. The handler module 402 can determine to immediately release a buffer location in response to determining either of the following conditions exist: 1) the read access request is directed to prefetchable memory space and the number of available storage locations, as indicated by the value stored at counter 120, is greater than the threshold number stored at the threshold register 122 and there are no pending write access requests, as indicated by the value stored at the counter 125; or 2) the read access request is directed to prefetchable memory space, the number of available storage locations, as indicated by the counter 120, is greater than 1, there are outstanding write requests and the number of outstanding write requests, as indicated by the value stored at the counter 125, is less that or equal to the threshold value stored at the threshold register 122 minus 1. If either of these conditions are met, the handler module 402 sends an immediate request to release a storage location of the outbound buffer 105. In addition, in response to receiving an access request, the handler module 402 provides the request to the outbound buffer 104 for storage, and indicates the type of access request to the counter logic 403 via the bus 415.

The outbound buffer 104 stores the access request at the illustrated storage location, and indicates whether the stored access request is a read access request or a write access request. In particular, in response to determining the access request is a read access request, the outbound buffer 104 provides an asserted signal via the bus 414. In particular, in response to determining the access request is a write access request, the outbound buffer 104 provides an asserted signal via the bus 412. In addition, the outbound buffer 104 provides an asserted signal via the bus 413 in response to receiving an indication that the stored access request has been completed.

The counter adjustment module 404 is configured to adjust (increment or decrement) the value stored at the counter 121 based on control signaling received from the counter logic 403. The counter logic 403 is configured to increment the value stored at the counter 121 in response to determining that a read access request was received at the handler module 402 and the handler module 402 did not request a release of a storage location in response to the read access request. The counter logic 403 is also configured to decrement the value stored at the counter 121 in response to determining that a general storage location of the outbound buffer 104 that stored a read access request has been released.

The compare module 405 compares the value stored at the counter 121, indicating the number of unreleased general storage locations that store read access requests, with the threshold value stored at the threshold register 123. The compare module 405 provides an asserted signal at the output in response to determining that the value stored at the counter 121 is greater than or equal to the threshold value.

The AND gate 407 provides an asserted signal in response to an indication, via an asserted signal on the bus 412, that the storage location of the outbound buffer 104 stores a write access request and, via an asserted signal on the bus 413, that the write access request has been completed. In response to the asserted signal, the OR gate 408 asserts the RELEASE signal.

The AND gate 406 provides an asserted signal in response to an indication, via an asserted signal on the bus 414, that the storage location of the outbound buffer 104 stores a read access request and, via an asserted signal on the bus 413, that the read access request has been completed, and via an asserted signal from the compare module 405, that the value stored at the counter 121 is greater than or equal to the threshold value stored at the register 123. In response to the asserted signal, the OR gate 408 asserts the RELEASE signal.

Figure 5:
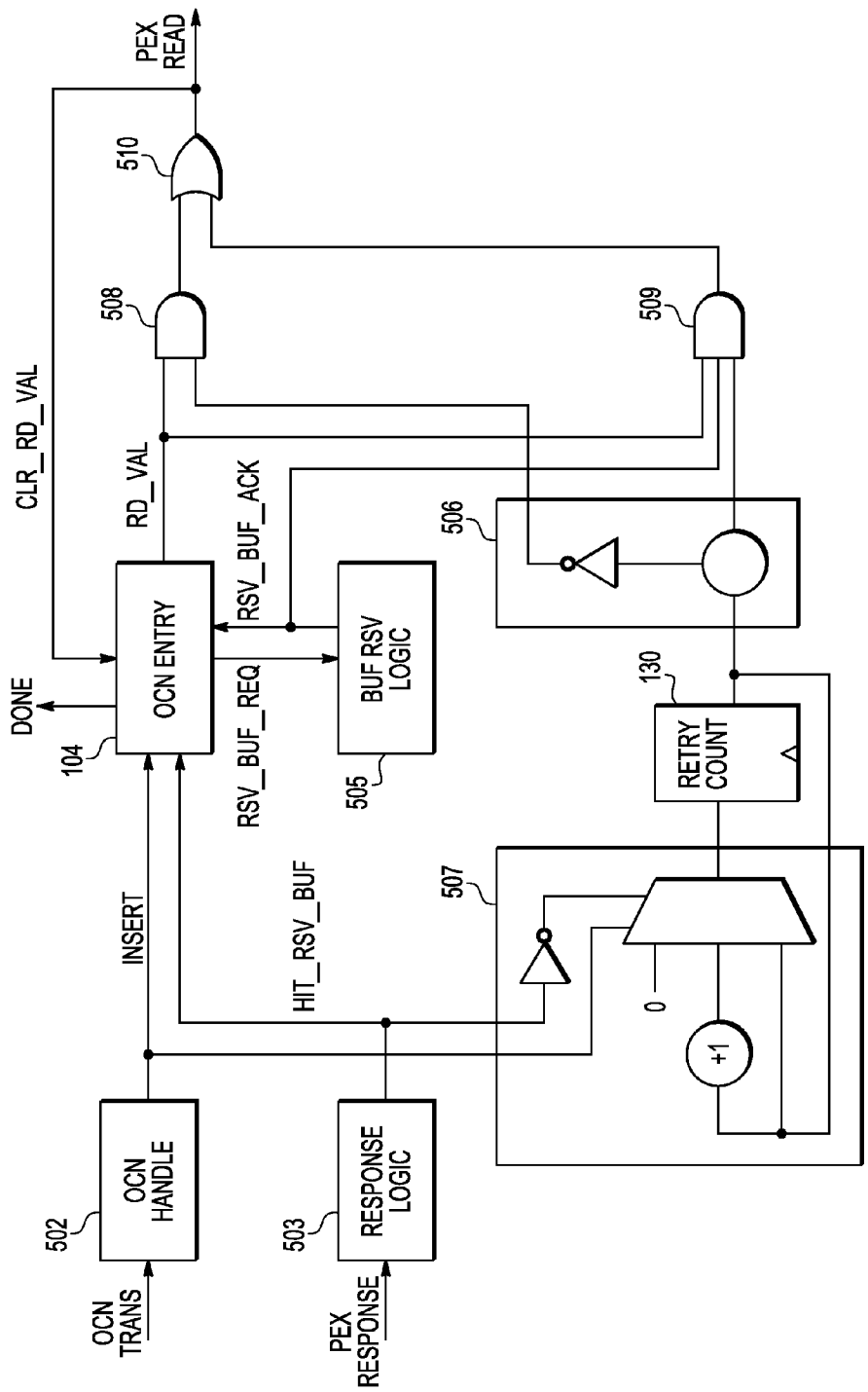
FIG. 5 is a block diagram of another portion of the data processing device of FIG. 1 in accordance with another embodiment of the present disclosure.

FIG. 5 illustrates portions of the control module 106, the control module 107 and the outbound buffer 104 in accordance with one embodiment of the present disclosure. In particular, FIG. 5 illustrates a handler module 502, a response module 503, a storage location of the outbound buffer 104, the counter 130, a reserve module 505, compare module 506, counter adjustment module 507, AND gates 508 and 509, and OR gate 510. The handler module 502 includes an input connected to the bus 172 to receive access requests, and an output. The response module 503 includes an input connected to the bus 177 to receive data responsive to read access requests and an output. The adjustment module 507 includes an input connected to the output of the handler module 502, an input connected to the output of the response module 503, an input connected to the counter 130, and output connected to the counter 130. The compare module 506 includes an input connected to the output of the counter 130, a first output and a second output.

The storage location of the outbound buffer 104 includes an input connected to the output of the handler module 502, an input connected to the output of the response module 503, an output to provide a signal indicating an access request stored at the storage location has been completed, an output connected to an input of the reserve module 505, and an output to provide a signal that a read access request is stored at the storage location. The storage location of the outbound buffer 104 also includes an input connected to an output of the reserve module 505 and an input to receive an indication that a read access request has been issued. The AND gate 508 includes an input connected to the storage location of the outbound buffer 104 to receive the signal indicating that a read access request is stored at the storage location, an input connected to the first output of the compare module 506, and an output. The AND gate 509 includes an input connected to the storage location of the outbound buffer 104 to receive the signal indicating that a read access request is stored at the storage location, an input connected to the second output of the compare module 506, an input connected to the output of the reserve module 505, and an output. The OR gate 510 includes an input connected to the output of the AND gate 508, an input connected to the output of the AND gate 509, and an output to provide a signal indicating that interface 103 should issue a read access request based on the information stored at the illustrated storage location of the outbound buffer 104.

In operation, the handler module 502 receives an access request from the interface 102 and provides the access request for storage at the illustrated storage location of the outbound buffer 104. In response, the adjustment module 507 resets the value stored at the counter 130 to an initial value, such as zero. In addition, the outbound buffer 104 stores the access request at the storage location, and asserts the signal indicating that a read access is stored at the storage location.

The compare module 506 compares the value stored at the counter 130 with the threshold value stored at the threshold register 131. In response to determining the value stored at the counter 130 is equal to or less than the threshold value, the compare module 506 asserts a signal at the first output and negates a signal at the second output. In response to determining the value stored at the counter 130 is greater than the threshold value, the compare module 506 negates the signal at the first output and asserts the signal at the second output. Accordingly, the two outputs of the compare module 506 provide complementary signals that indicate the value stored at the counter 130 relative to the threshold value.

After the counter value is reset in response to a read access request being stored at the storage location of the outbound buffer 104, the signal provided by the compare module 506 to the AND gate 508 will be asserted. Thus, both signals provided to the input of the AND gate 508 are asserted in response to a read access request being received, resulting in assertion of a signal at the gate output. In response, the OR gate 510 asserts its output signal, thereby requesting that the interface 103 issue the read access request.

Response module 503 receives data responsive to the read access request and provides it to the inbound buffer 105 for storage. If there is no space at the inbound buffer 105 to store the responsive data, the buffer discards the data and notifies the response module 503. In response to the notification, the response module 503 asserts a signal at its output. In response, the counter adjustment module 507 increments the value stored at the counter 130. In addition, the outbound buffer 104 determines whether the stored read access request has been issued more than the threshold number of times. If so, the outbound buffer 104 requests the buffer reserve logic to reserve a storage location at the inbound buffer 105 for the data responsive to the read access request. If the stored read access request has not been issued more than the threshold number of times, the outbound buffer 104 reasserts the signal indicating the stored access request is a read access request, causing reassertion of the output signal of the AND gate 508 and reissuing of the read request signal by the OR gate 510.

In response to a request from the outbound buffer 104, the reserve logic 505 provides an indication to the inbound buffer 105 that the next available storage location should be reserved, and waits for an indication that the storage location is available and reserved. In response to the indication, the reserve logic 505 asserts a signal at its output.

Accordingly, when a read access request has been issued more than the threshold number of times indicated by the value stored at the threshold register 131, and a storage location has been reserved at the inbound buffer 105 for data responsive to the read access request, each of the signals provided to the AND gate 509 will be in an asserted state. In response, the AND gate 509 asserts its output signal, thereby causing the OR gate 510 to reassert the read request signal at its output. Thus, the read access request is reissued after storage space has been reserved at the inbound buffer 105 for responsive data.

Figure 6:
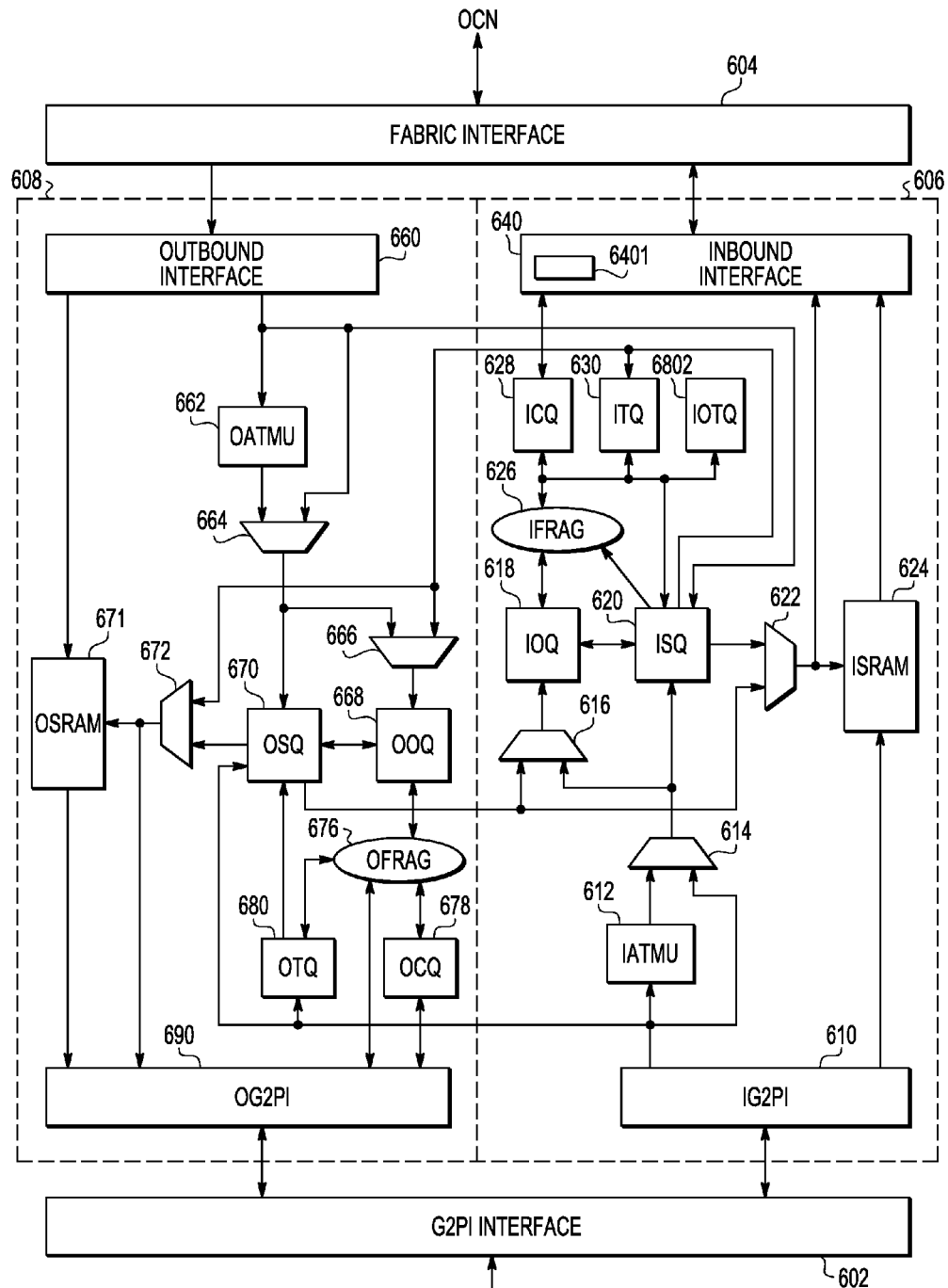
FIG. 6 is a block diagram of the gasket module of FIG. 1 in accordance with one embodiment of the present disclosure.

FIG. 6 is a block diagram illustrating additional details of the gasket 100 of FIG. 1 in accordance with one embodiment of the present disclosure. The gasket 100 includes a generic bus interface (G2PI) module 602, a fabric interface module 604, an inbound portion 606, and an outbound portion 608. Inbound portion 606 and outbound portion 608 are functionally similar to each other, with the exception that inbound portion 606 includes one additional module, IOTQ 6802. Inbound portion 606 receives data responsive to read access requests via bus PCIEX. Read and write access requests are received via bus OCN and outbound portion 608 is configured to provide the access requests via bus PCIEX.

Inbound portion 606 includes an inbound G2PI module (IG2PI) 610, an inbound address translation mapping unit (IATMU) 612, multiplexors 614, 616, and 622, an inbound ordered queue (IOQ) 618, an inbound static queue (ISQ) 620, an inbound static random access memory (ISRAM) 624, an inbound fragmentation (IFRAG) module 626, an inbound command queue (ICQ) 628, an inbound tag queue (ITQ) 630, an inbound ordered tag queue (IOTQ) 6802, and an inbound interface module 640.

Outbound portion 608 includes an outbound interface module 660, an outbound address translation mapping unit (OATMU) 662, multiplexors 664, 666, and 672, an outbound ordered queue (OOQ) 668, an outbound static queue (OSQ) 670, an outbound static random access memory (OSRAM) 671, an outbound fragmentation (OFRAG) module 676, an outbound command queue (OCQ) 678, an outbound tag queue (OTQ) 680, and an outbound G2PI module (OG2PI) 690.

G2PI module 602 is connected to IG2PI module 610, which together are configured to provide an interface between the PCIEX bus and logic blocks of inbound portion 606. IG2PI module 610 is connected to IATMU 612 and ISRAM 624. IATMU 612 is configured to receive requests from IG2PI module 610 to determine whether the address associated with the request corresponds to a memory-mapped module, and if so, perform an address translation and provides the translated address to IOQ 618 via multiplexor 614 and 616, and to ISQ 620 via multiplexor 614. ISRAM 624 is a three-kilobyte SRAM that provides storage for the inbound buffer 105 of FIG. 1.

IOQ 618 is configured to hold transaction type attributes for all requests received from IG2PI module 610, and access request completion information received from OSQ 670 via multiplexor 616. IOQ 618 is responsible for determining which transaction is the next to be sent to ICQ 628 and fabric interface module 604 via inbound interface module 640. IOQ 618 is a twenty-one entry queue and uses ISQ 620 and OSQ 670 pointers to link the transaction attribute with its ISQ/OSQ entry. ISQ 620 is a fourteen-entry queue configured to store the address and attributes associated with inbound requests received from IG2PI 610. The attributes are translated from PCI-E format to a format compatible with transmission over the bus OCN before they are stored in ISQ 620. ISQ 620 receives information from IOTQ 6802 before scheduling completions to be returned to OG2PI 690. Each request received from IG2PI module 610 occupies an entry at ISQ 620. The index of an entry at ISQ 620 serves as a static queue pointer used by other portions, including IOQ 618, ISRAM 624 (via multiplexor 622), IFRAG module 626, ICQ 628, ITQ 630, IOTQ 6802, and related blocks at outbound portion 608 including OOQ 668 via multiplexor 666 and OSRAM 671 via multiplexor 672. Accordingly, IOQ 618, ISQ 620, and the other modules described herein can perform at least some of the functions of the inbound buffer 105 of FIG. 1.

IFRAG module 626 is configured to receive requests from IOQ 618, fragment the request into multiple spawned requests if required, dispatch the requests to ICQ 628, and stores the transaction type at ICQ 628 and IOTQ 6802. IFRAG module 626 also requests a tag from ITQ 630 if needed to support non-posted transactions (transactions that require a response). ICQ 628 is configured to store a portion of the transaction attributes associated with each transaction sent from IFRAG module 626 to inbound interface module 640. Inbound interface module 640 includes a dispatch module 6401 that paces the rate at which requests are dispatched to bus OCN. ICQ 628 is an eight-entry queue that is indexed by OSQ 670 and ISQ 620 index pointers to link the transaction attribute with its corresponding OSQ/ISQ entry. A read or a write operation is initiated via inbound interface module 640. Once the read or write operation is successfully completed, the request is de-allocated in ICQ 628. ITQ 630 is a sixteen-entry queue configured to generate tags used for tracking inbound non-posted transactions (memory reads). ITQ 630 uses OSQ/ISQ index pointers to link the transaction tag with its OSQ/ISQ entry. ITQ 630 also monitors completions coming back from fabric interface module 604 via inbound interface module 640 and determines whether the completions are for valid outstanding inbound requests. This hit information is forwarded to ISQ 620 to complete the processing of outstanding requests.

IOTQ 6802 includes that stores attributes that are used to keep track of outstanding read access requests that are going to be returned via fabric interface module 604. IOTQ 6802 schedules completions, which are returned via OG2PI module 690 by communicating with ISQ 620.

With respect to the outbound portion 608, the OSRAM 671 provides storage space for the outbound buffer 104 of FIG. 1. The OSQ 670 and OOQ 668 are control modules that can include the counters, threshold registers, and other modules to control the outbound buffer 104 as described herein. The OFRAG module 676 is configured to fragment access requests into one or more sub-requests for communication by the G2PI interface module 602. The OCQ 678 and OTQ 680 store command and tag information, respectively, for outbound access requests. The OATMU 662 provides address translation for outbound access requests.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly, intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a data processing device, a method comprising:
   in response to receiving access requests that are requests to transfer information via an interface module, adjusting a count of a number of released buffer spaces at an outbound request buffer from an initial amount to an adjusted amount, the initial amount based on a maximum number of write access requests that can be stored at the outbound request buffer at the same time and storing the access requests at the outbound request buffer;
   in response to determining the number of released buffer spaces at the outbound request buffer is less than a first threshold amount, communicating an indication from the interface module that write access requests and read access requests are not to be communicated to the interface module; and
   storing at the outbound request buffer a set of access requests, the number of access requests in the set greater than the maximum number of write access requests that can be stored at the outbound request buffer.

2. The method of claim 1, further comprising:
   decrementing the number of released buffer spaces in response to receiving a first access request at the interface module;

in response to determining the first access request is a read access request, storing the first access request at the outbound request buffer and incrementing the number of released buffer spaces prior to receiving an indication at the interface module that the first access request is complete.

3. The method of claim 2, further comprising:
in response to determining the first access request is a write access request, incrementing the number of released buffer spaces in response to receiving the indication at the interface module that the first access request is complete.

4. The method of claim 1, further comprising:
decrementing the number of released buffer spaces in response to receiving a first access request at the interface module;
in response to determining the first access request is a read access request:
storing the first access request at the outbound request buffer and incrementing the number of released buffer spaces prior to receiving an indication at the interface module that the first access request is complete in response to determining that a number of storage locations available to store the read access request is greater than a second threshold amount.

5. The method of claim 4, further comprising:
in response to determining the first access request is a read access request, incrementing the number of released buffer spaces prior to receiving an indication at the interface module that the first access request is complete in response to determining that a number of write access requests stored at the outbound request buffer is less than the second threshold amount.

6. The method of claim 5, wherein incrementing the number of released buffer spaces comprises incrementing the number of released buffer spaces in response to determining the read access request is associated with a prefetchable memory location.

7. The method of claim 1, further comprising receiving the access requests from one or more processor cores.

8. The method of claim 1, further comprising:
issuing a first occurrence of a read access request to request first data;
in response to receiving the first data and determining space is available at an inbound data buffer, storing the first data at the inbound data buffer; and
in response to receiving the first data and determining space is not available at the inbound data buffer:
discarding the first data; and
issuing a second occurrence of the read access request.

9. At a data processing device, a method comprising:
issuing a first occurrence of a read access request from an interface module of the data processing device;
receiving first data at the interface module in response to the first occurrence of the first read access request;
storing the first data at an inbound data buffer of the interface module in response to determining space is available at the inbound data buffer;
discarding the first data at the interface module in response to determining space to store the first data is not available;
adjusting a number of discarded data responses in response to discarding the first data; and
in response to the number of discarded data responses being greater than a threshold number, issuing a second occurrence of the first read access request in response to determining space is available at the inbound data buffer to store the first data.

10. The method of claim 9, wherein issuing the second occurrence of the first read access request further comprises:
in response to determining the number of discarded data responses is not greater than the threshold number, issuing the second occurrence of the first read access request for the second time without determining whether space is available at the inbound data buffer to store the first data.

11. The method of claim 9, further comprising determining space is available for the first data in response to determining a location of the inbound data buffer where the first data is to be stored is in the process of being flushed of previously stored data.

12. A data processing device, comprising:
an outbound request buffer to store a maximum number of access requests that are requests to transfer information via a gasket, the maximum number of access requests greater than a maximum number of write access requests that can be stored at the outbound request buffer at the same time; and
an interface coupled to the outbound request buffer, the interface comprising:
an input to receive the access requests;
a first counter to store a value indicating a number of released buffer spaces at the outbound request buffer, the first counter to adjust the value from an initial amount to an adjusted amount in response to receiving the access requests, the initial amount based on the maximum number of write access requests that can be stored at the outbound request buffer; and
the interface to, in response to determining the value stored at the counter is less than a first threshold amount, communicate an indication that access requests are not to be communicated to the gasket.

13. The data processing device of claim 12, wherein the interface:
decrements the value stored at the first counter in response to receiving a first access request at the interface module; and
in response to determining the first access request is a read access request, stores the first access request at the outbound request buffer and increment the value stored at the first counter prior to receiving an indication at the gasket that the first access request is complete.

14. The data processing device of claim 13, wherein the interface, in response to determining the first access request is a write access request, increments the value stored at the first counter in response to receiving an indication that the first access request is complete.

15. The data processing device of claim 14, wherein the interface:
decrements the value stored at the first counter in response to receiving the first access request at the gasket; and
in response to determining the first access request is a read access request:
stores the first access request at the outbound request buffer and increment the value stored at the first counter prior to receiving an indication at the gasket that the first access request is complete in response to determining a number of storage locations at the outbound request buffer available to store the first access request is greater than a second threshold amount.

16. The data processing device of claim 15, wherein the interface increments the value stored at the first counter in response to determining a number of write access requests stored at the outbound request buffer is less than a third threshold amount.

17. The data processing device of claim 12, wherein the interface:
   in response to determining the first access request is a read access request, issues a first occurrence of the read access request;
   receives first data in response to the first occurrence of the read access request;
   stores the first data at an inbound data buffer in response to determining space is available at the inbound data buffer;
   discards the first data at the gasket in response to determining space to store the first data is not available at the inbound data buffer; and
   issues a second occurrence of the read access request in response to discarding the first data.

18. The data processing device of claim 12, wherein the interface is coupled to a peripheral component interconnect express (PCIE) interface.

* * * * *